US011134525B2

(12) United States Patent
Yu et al.

(10) Patent No.: US 11,134,525 B2
(45) Date of Patent: Sep. 28, 2021

(54) DATA SENDING METHOD AND DEVICE

(71) Applicant: Huawei Technologies Co., Ltd., Shenzhen (CN)

(72) Inventors: Feng Yu, Beijing (CN); Mingchao Li, Beijing (CN); Jiezuo Zhu, Beijing (CN); Guanglin Han, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 15/727,882

(22) Filed: Oct. 9, 2017

(65) Prior Publication Data

US 2018/0035452 A1 Feb. 1, 2018

Related U.S. Application Data

(63) Continuation-in-part of application No. PCT/CN2015/076374, filed on Apr. 10, 2015.

(51) Int. Cl.
*H04W 76/10* (2018.01)
*H04W 72/12* (2009.01)
(Continued)

(52) U.S. Cl.
CPC ....... *H04W 76/10* (2018.02); *H04W 56/0025* (2013.01); *H04W 72/1278* (2013.01);
(Continued)

(58) Field of Classification Search
CPC ............. H04W 76/10; H04W 56/0025; H04W 72/1278; H04W 8/005; H04W 92/18; H04W 92/02; H04L 67/12
See application file for complete search history.

(56) References Cited

U.S. PATENT DOCUMENTS

2009/0100435 A1    4/2009   Papaefstathiou et al.
2013/0150108 A1    6/2013   Yang et al.
(Continued)

FOREIGN PATENT DOCUMENTS

CN    103493529 A    1/2014
CN    103974431 A    8/2014
(Continued)

OTHER PUBLICATIONS

3GPP TSG RAN WG1 Meeting#77 R1-142401,"D2D Broadcast Control Information and Related Procedures," Ericsson, May 19-23, 2014, 6 pages.

(Continued)

*Primary Examiner* — Faruk Hamza
*Assistant Examiner* — Abusayeed M Haque
(74) *Attorney, Agent, or Firm* — Slater Matsil, LLP

(57) ABSTRACT

The present invention relates to the field of the Internet of Vehicles and discloses a data sending method and device. In one example, the method includes: receiving scheduling information sent by a first serving cell, where the scheduling information carries at least a second serving cell identifier of a second serving cell and an available device to device D2D transmission resource in the second serving cell; performing cell synchronization with the second serving cell based on the second serving cell identifier; and sending device to device D2D data on the available D2D transmission resource in the second serving cell according to the scheduling information.

21 Claims, 6 Drawing Sheets

(51) Int. Cl.
*H04W 92/18* (2009.01)
*H04W 76/14* (2018.01)
*H04W 56/00* (2009.01)
H04L 29/08 (2006.01)
H04W 8/00 (2009.01)

(52) U.S. Cl.
CPC ............ *H04W 76/14* (2018.02); *H04L 67/12* (2013.01); *H04W 8/005* (2013.01); *H04W 92/18* (2013.01)

(56) References Cited

U.S. PATENT DOCUMENTS

| | | | |
|---|---|---|---|
| 2013/0157676 A1 | 6/2013 | Baek et al. | |
| 2014/0038653 A1 | 2/2014 | Mildh et al. | |
| 2014/0226629 A1 | 8/2014 | Kim et al. | |
| 2014/0243039 A1* | 8/2014 | Schmidt | H04W 4/02 455/552.1 |
| 2014/0274066 A1 | 9/2014 | Fodor et al. | |
| 2014/0370904 A1 | 12/2014 | Smith et al. | |
| 2015/0003442 A1* | 1/2015 | Sun | H04W 56/0015 370/350 |
| 2015/0049674 A1 | 2/2015 | Kuo | |
| 2015/0065154 A1* | 3/2015 | Van Phan | H04W 72/042 455/450 |
| 2015/0373719 A1 | 12/2015 | Xu et al. | |
| 2016/0050698 A1* | 2/2016 | Siomina | H04W 72/0493 370/329 |
| 2016/0174181 A1* | 6/2016 | Fujishiro | H04W 76/14 455/435.1 |
| 2016/0198377 A1* | 7/2016 | Centonza | H04W 36/14 370/331 |
| 2016/0212664 A1* | 7/2016 | Uemura | H04W 36/04 |
| 2016/0227518 A1* | 8/2016 | Li | H04W 76/14 |
| 2016/0269953 A1* | 9/2016 | Jung | H04W 76/14 |
| 2017/0013523 A1* | 1/2017 | Jung | H04W 48/20 |
| 2017/0026939 A1* | 1/2017 | Fodor | H04L 5/0073 |
| 2017/0127473 A1* | 5/2017 | Virtej | H04W 76/38 |
| 2017/0142741 A1* | 5/2017 | Kaur | H04W 76/14 |

FOREIGN PATENT DOCUMENTS

| | | |
|---|---|---|
| CN | 104427576 A | 3/2015 |
| EP | 2700259 A1 | 2/2014 |
| EP | 2713650 A1 | 4/2014 |
| EP | 2975792 A1 | 1/2016 |
| JP | 2016536853 A1 | 11/2016 |
| RU | 2481618 C2 | 5/2013 |
| WO | 2014142505 A1 | 9/2014 |
| WO | 2015050406 A1 | 4/2015 |

OTHER PUBLICATIONS

3GPP TSG-RAN Working Group 2 meeting #87bis R2-144101,"Report of 3GPP TSG RAN WG2 meeting#87," held in Dresden,Germany, Aug. 18-22, 2014, Shanghi, China, Oct. 6-Oct. 10, 2014, 164 pages.
3GPP TSG-RAN2#87bis R2-144484,"Inter-frequency and inter-PLMN discovery relevant signalling." ZTE, Oct. 6-Oct. 10, 2014, 3 pages.

* cited by examiner

DATA SENDING METHOD AND DEVICE

CROSS-REFERENCE TO RELATED APPLICATIONS

This application is a continuation of International Application No. PCT/CN2015/076374, filed on Apr. 10, 2015, the disclosure of which is hereby incorporated by reference in its entirety.

TECHNICAL FIELD

The present invention relates to the field of Internet of Vehicles, and in particular, to a data sending method and device.

BACKGROUND

The Internet of Vehicles (IoV) is a new type of management and service network that integrates a large quantity of software technologies and a large amount of information service content based on a combination of Internet and Internet of Things technologies.

In an Internet of Vehicles, to ensure safe driving of vehicles, different vehicles on roads need to exchange some data with each other. By processing such data, a vehicle can learn a status of a road and a status of another vehicle, for example, a vehicle accident ahead, or even can predict that an accident is about to take place, and give an alarm to a driver, so that the driver changes a driving policy. Such communication between vehicles may usually be implemented by using a D2D (device to device) technology. The D2D technology enables vehicles to perform direct communication with each other on a data transmission resource (that is, a carrier) provided by a base station. With development of the Internet of Vehicles, vehicles have increasingly high requirements on communication. To increase a system capacity, UE may be equipped with multiple radio transceivers. In this way, the UE can perform communication on multiple carriers.

However, although UE supports communication on multiple carriers, a current base station cannot schedule the UE to perform D2D direct communication on another carrier, leading to a waste of spectrum resources and a decrease in the system capacity.

SUMMARY

To avoid wasting spectrum resources, embodiments of the present invention provide a data sending method and device.

According to a first aspect, an embodiment of the present invention provides an apparatus including a receiver configured to receive scheduling information from a first serving cell. The scheduling information carries at least a second serving cell identifier of a second serving cell and an available device to device (D2D) transmission resource in the second serving cell. The apparatus further includes a processor and a memory storing a program to be executed in the processor. The program comprises instructions for performing cell synchronization with the second serving cell based on the second serving cell identifier. A transmitter is configured to send D2D data on the available D2D transmission resource in the second serving cell according to the scheduling information.

With reference to the first aspect, in a first possible implementation manner provided in this embodiment of the present invention, the receiver is configured to receive RRC control information sent by the first serving cell, where the RRC control information carries the scheduling information; or the receiver is configured to receive PDCCH scheduling information sent by the first serving cell, where the PDCCH scheduling information carries the scheduling information; or the receiver is configured to receive system broadcast information sent by the first serving cell, where the system broadcast information carries the scheduling information.

With reference to the first possible implementation manner of the first aspect, in a second possible implementation manner provided in this embodiment of the present invention, the scheduling information further carries a transmission mode in the second serving cell, and the transmission mode is a D2D discovery mode or a D2D communication mode.

With reference to the second possible implementation manner of the first aspect, in a third possible implementation manner provided in this embodiment of the present invention, the transmitter is configured to send the device to device D2D data on the available D2D transmission resource in the second serving cell by using the transmission mode in the second serving cell that is carried in the scheduling information.

With reference to any one of the foregoing possible implementation manners, in a fourth possible implementation manner provided in this embodiment of the present invention, the available D2D transmission resource in the second serving cell includes at least one of a dynamic service data transmission resource, a semi-static service data transmission resource, and a service data transmission resource pool.

With reference to any one of the foregoing possible implementation manners, in a fifth possible implementation manner provided in this embodiment of the present invention, the scheduling information further includes a modulation and coding scheme that is used in data transmission.

With reference to the fifth possible implementation manner of the first aspect, in a sixth possible implementation manner provided in this embodiment of the present invention, the program further includes instructions for performing modulation and coding on to-be-transmitted service data by using the modulation and coding scheme, to obtain the D2D data.

With reference to any one of the foregoing possible implementation manners, in a seventh possible implementation manner provided in this embodiment of the present invention, when a transmission mode in the second serving cell is a D2D communication mode, the available D2D transmission resource in the second serving cell includes at least one of an available SA resource and an available service data transmission resource.

With reference to the seventh possible implementation manner of the first aspect, in an eighth possible implementation manner provided in this embodiment of the present invention, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

With reference to any one of the foregoing possible implementation manners, in a ninth possible implementation manner provided in this embodiment of the present invention, when a transmission mode in the second serving cell is a D2D communication mode, the D2D data is at least one of SA information and service data.

With reference to the ninth possible implementation manner of the first aspect, in a tenth possible implementation manner provided in this embodiment of the present invention, the transmitter is configured to: when the scheduling information carries the second serving cell identifier, an available service data transmission resource in the first serving cell, and an available SA resource in the second serving cell, send the SA information on the available SA resource in the second serving cell, and send the service data on the available service data transmission resource in the first serving cell, where the SA information is used to indicate the available service data transmission resource in the first serving cell and a modulation and coding scheme.

With reference to the ninth possible implementation manner of the first aspect, in an eleventh possible implementation manner provided in this embodiment of the present invention, the transmitter is configured to: when the scheduling information carries the second serving cell identifier, an available SA resource in the first serving cell, and an available service data transmission resource in the second serving cell, send the SA information on the available SA resource in the first serving cell, and send the service data on the available service data transmission resource in the second serving cell, where the SA information is used to indicate the available service data transmission resource in the second serving cell and a modulation and coding scheme.

With reference to the ninth possible implementation manner of the first aspect, in a twelfth possible implementation manner provided in this embodiment of the present invention, the transmitter is configured to: when the scheduling information carries the second serving cell identifier, an available SA resource in the second serving cell, and an available service data transmission resource in the second serving cell, send the SA information on the available SA resource in the second serving cell, and send the service data on the available service data transmission resource in the second serving cell, where the SA information is used to indicate the available service data transmission resource in the second serving cell and a modulation and coding scheme.

With reference to any one of the foregoing possible implementation manners, in a thirteenth possible implementation manner provided in this embodiment of the present invention, the transmitter is further configured to send a carrier list to the first serving cell, where the carrier list carries carrier information that a current terminal is interested in, and the carrier information is frequency information, or cell set information on a frequency, so that the first serving cell acquires the second serving cell according to the carrier list.

With reference to the thirteenth possible implementation manner of the first aspect, in a fourteenth possible implementation manner provided in this embodiment of the present invention, the carrier list further carries a signal measurement report of the frequency or a signal measurement report of a cell set.

With reference to any one of the foregoing possible implementation manners, in a fifteenth possible implementation manner provided in this embodiment of the present invention, the program comprises instructions for a connection processing module, where the connection processing module is configured to: when the available D2D transmission resource in the second serving cell is a dynamic transmission resource, remain in a state of connection with the first serving cell; or the connection processing module is configured to: when the available D2D transmission resource in the second serving cell is a semi-static transmission resource or a transmission resource pool, remain in a state of connection with the first serving cell; or the connection processing module is configured to: when the available D2D transmission resource in the second serving cell is a semi-static transmission resource or a transmission resource pool, remain in a state of being idle with the first serving cell; or the connection processing module is configured to: when the available D2D transmission resource in the second serving cell is a semi-static transmission resource or a transmission resource pool, remain in a state of connection with the second serving cell; or the connection processing module is configured to: when the available D2D transmission resource in the second serving cell is a semi-static transmission resource or a transmission resource pool, remain in a state of being idle with the second serving cell.

With reference to any one of the foregoing possible implementation manners, in a sixteenth possible implementation manner provided in this embodiment of the present invention, the first serving cell is a primary serving cell, or a secondary serving cell other than the second serving cell.

According to a second aspect, an embodiment of the present invention provides a data sending method, including: receiving scheduling information sent by a first serving cell, where the scheduling information carries at least a second serving cell identifier and an available device to device D2D transmission resource in a second serving cell; performing cell synchronization with the second serving cell based on the second serving cell identifier; and sending device to device D2D data on the available D2D transmission resource in the second serving cell according to the scheduling information.

With reference to the second aspect, in a first possible implementation manner provided in this embodiment of the present invention, the receiving scheduling information sent by a first serving cell includes: receiving RRC control information sent by the first serving cell, where the RRC control information carries the scheduling information; or receiving PDCCH scheduling information sent by the first serving cell, where the PDCCH scheduling information carries the scheduling information; or receiving system broadcast information sent by the first serving cell, where the system broadcast information carries the scheduling information.

With reference to the first possible implementation manner of the second aspect, in a second possible implementation manner provided in this embodiment of the present invention, the scheduling information further carries a transmission mode in the second serving cell, and the transmission mode is a D2D discovery mode or a D2D communication mode.

With reference to the second possible implementation manner of the second aspect, in a third possible implementation manner provided in this embodiment of the present invention, the sending device to device D2D data on the available D2D transmission resource in the second serving cell according to the scheduling information includes: sending the device to device D2D data on the available D2D transmission resource in the second serving cell by using the transmission mode in the second serving cell that is carried in the scheduling information.

With reference to any one of the foregoing possible implementation manners, in a fourth possible implementation manner provided in this embodiment of the present invention, the available D2D transmission resource in the second serving cell includes at least one of a dynamic service data transmission resource, a semi-static service data transmission resource, and a service data transmission resource pool.

With reference to any one of the foregoing possible implementation manners, in a fifth possible implementation manner provided in this embodiment of the present invention, the scheduling information further includes a modulation and coding scheme that is used in data transmission.

With reference to the fifth possible implementation manner of the second aspect, in a sixth possible implementation manner provided in this embodiment of the present invention, before the sending D2D data on the available D2D transmission resource in the second serving cell, the method further includes: performing modulation and coding on to-be-transmitted service data by using the modulation and coding scheme, to obtain the D2D data.

With reference to any one of the foregoing possible implementation manners, in a seventh possible implementation manner provided in this embodiment of the present invention, when a transmission mode in the second serving cell is a D2D communication mode, the available D2D transmission resource in the second serving cell includes at least one of an available SA resource, and an available service data transmission resource.

With reference to the seventh possible implementation manner of the second aspect, in an eighth possible implementation manner provided in this embodiment of the present invention, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

With reference to any one of the foregoing possible implementation manners, in a ninth possible implementation manner provided in this embodiment of the present invention, when a transmission mode in the second serving cell is a D2D communication mode, the D2D data is at least one of SA information and service data.

With reference to the ninth possible implementation manner of the second aspect, in a tenth possible implementation manner provided in this embodiment of the present invention, the sending D2D data on the available D2D transmission resource in the second serving cell according to the scheduling information includes: when the scheduling information carries the second serving cell identifier, an available service data transmission resource in the first serving cell, and an available SA resource in the second serving cell, sending the SA information on the available SA resource in the second serving cell, and sending the service data on the available service data transmission resource in the first serving cell, where the SA information is used to indicate the available service data transmission resource in the first serving cell and a modulation and coding scheme.

With reference to the ninth possible implementation manner of the second aspect, in an eleventh possible implementation manner provided in this embodiment of the present invention, the sending D2D data on the available D2D transmission resource in the second serving cell according to the scheduling information includes: when the scheduling information carries the second serving cell identifier, an available SA resource in the first serving cell, and an available service data transmission resource in the second serving cell, sending the SA information on the available SA resource in the first serving cell, and sending the service data on the available service data transmission resource in the second serving cell, where the SA information is used to indicate the available service data transmission resource in the second serving cell and a modulation and coding scheme.

With reference to the ninth possible implementation manner of the second aspect, in a twelfth possible implementation manner provided in this embodiment of the present invention, the sending D2D data on the available D2D transmission resource in the second serving cell according to the scheduling information includes: when the scheduling information carries the second serving cell identifier, an available SA resource in the second serving cell, and an available service data transmission resource in the second serving cell, sending the SA information on the available SA resource in the second serving cell, and sending the service data on the available service data transmission resource in the second serving cell, where the SA information is used to indicate the available service data transmission resource in the second serving cell and a modulation and coding scheme.

With reference to any one of the foregoing possible implementation manners, in a thirteenth possible implementation manner provided in this embodiment of the present invention, before the receiving scheduling information sent by a first serving cell, the method further includes: sending a carrier list to the first serving cell, where the carrier list carries carrier information that a current terminal is interested in, and the carrier information is frequency information, or cell set information on a frequency, so that the first serving cell acquires the second serving cell according to the carrier list.

With reference to the thirteenth possible implementation manner of the second aspect, in a fourteenth possible implementation manner provided in this embodiment of the present invention, the carrier list further carries a signal measurement report of the frequency or a signal measurement report of a cell set.

With reference to any one of the foregoing possible implementation manners, in a fifteenth possible implementation manner provided in this embodiment of the present invention, the method further includes: when the available D2D transmission resource in the second serving cell is a dynamic transmission resource, remaining in a state of connection with the first serving cell; or when the available D2D transmission resource in the second serving cell is a semi-static transmission resource or a transmission resource pool, remaining in a state of connection with the first serving cell; or when the available D2D transmission resource in the second serving cell is a semi-static transmission resource or a transmission resource pool, remaining in a state of being idle with the first serving cell; or when the available D2D transmission resource in the second serving cell is a semi-static transmission resource or a transmission resource pool, remaining in a state of connection with the second serving cell; or when the available D2D transmission resource in the second serving cell is a semi-static transmission resource or a transmission resource pool, remaining in a state of being idle with the second serving cell.

With reference to any one of the foregoing possible implementation manners, in a sixteenth possible implementation manner provided in this embodiment of the present invention, the first serving cell is a primary serving cell, or a secondary serving cell other than the second serving cell.

According to a third aspect, an embodiment of the present invention provides an apparatus comprising a processor and a memory storing a program to be executed in the processor.

The program comprises instructions for generating scheduling information according to a second serving cell identifier of a second serving cell and an available device to device (D2D) transmission resource in a second serving cell. A transmitter is configured to send the scheduling information to user equipment within coverage of a first serving cell. The available D2D transmission resource in the second serving cell is used to receive D2D data from the user equipment.

With reference to the third aspect, in a first possible implementation manner provided in this embodiment of the present invention, the transmitter is configured to send RRC control information to the user equipment, where the RRC control information carries the scheduling information; or the transmitter is configured to send PDCCH scheduling information to the user equipment, where the PDCCH scheduling information carries the scheduling information; or the transmitter is configured to send system broadcast information to the user equipment, where the system broadcast information carries the scheduling information.

With reference to the first possible implementation manner of the third aspect, in a second possible implementation manner of the third aspect, the scheduling information further carries a transmission mode in the second serving cell, and the transmission mode is a D2D discovery mode or a D2D communication mode.

With reference to any one of the foregoing possible implementation manners, in a third possible implementation manner of the third aspect, the available D2D transmission resource in the second serving cell includes at least one of a dynamic service data transmission resource, a semi-static service data transmission resource, and a service data transmission resource pool.

With reference to any one of the foregoing possible implementation manners, in a fourth possible implementation manner of the third aspect, the scheduling information further includes a modulation and coding scheme that is used in data transmission.

With reference to any one of the foregoing possible implementation manners, in a fifth possible implementation manner of the third aspect, when a transmission mode in the second serving cell is a D2D communication mode, the available D2D transmission resource in the second serving cell includes at least one of an available SA resource and an available service data transmission resource.

With reference to the fifth possible implementation manner of the third aspect, in a sixth possible implementation manner of the third aspect, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

With reference to any one of the foregoing possible implementation manners, in a seventh possible implementation manner of the third aspect, when a transmission mode in the second serving cell is a D2D communication mode, the D2D data is at least one of SA information and service data.

With reference to any one of the foregoing possible implementation manners, in an eighth possible implementation manner of the third aspect, the base station further includes: a receiver, configured to receive a carrier list sent by the user equipment, where the carrier list carries carrier information that a current terminal is interested in, and the carrier information is frequency information, or cell set information on a frequency; and wherein the program includes instructions for acquiring the second serving cell according to the carrier list.

With reference to the eighth possible implementation manner of the third aspect, in a ninth possible implementation manner of the third aspect, the carrier list further carries a signal measurement report of the frequency or a signal measurement report of a cell set.

With reference to any one of the foregoing possible implementation manners, in a tenth possible implementation manner of the third aspect, the first serving cell is a primary serving cell, or a secondary serving cell other than the second serving cell.

According to a fourth aspect, an embodiment of the present invention provides a resource scheduling method, including: generating scheduling information according to a second serving cell identifier and an available device to device D2D transmission resource in a second serving cell; and sending the scheduling information to user equipment within coverage of a first serving cell, so that the user equipment sends device to device D2D data on the available D2D transmission resource in the second serving cell according to the scheduling information.

With reference to the fourth aspect, in a first possible implementation manner provided in this embodiment of the present invention, the sending the scheduling information to user equipment includes: sending RRC control information to the user equipment, where the RRC control information carries the scheduling information; or sending PDCCH scheduling information to the user equipment, where the PDCCH scheduling information carries the scheduling information; or sending system broadcast information to the user equipment, where the system broadcast information carries the scheduling information.

With reference to the first possible implementation manner of the fourth aspect, in a second possible implementation manner of the fourth aspect, the scheduling information further carries a transmission mode in the second serving cell, and the transmission mode is a D2D discovery mode or a D2D communication mode.

With reference to any one of the foregoing possible implementation manners, in a third possible implementation manner of the fourth aspect, the available D2D transmission resource in the second serving cell includes at least one of a dynamic service data transmission resource, a semi-static service data transmission resource, and a service data transmission resource pool.

With reference to any one of the foregoing possible implementation manners, in a fourth possible implementation manner of the fourth aspect, the scheduling information further includes a modulation and coding scheme that is used in data transmission.

With reference to any one of the foregoing possible implementation manners, in a fifth possible implementation manner of the fourth aspect, when a transmission mode in the second serving cell is a D2D communication mode, the available D2D transmission resource in the second serving cell includes at least one of an available SA resource and an available service data transmission resource.

With reference to the fifth possible implementation manner of the fourth aspect, in a sixth possible implementation manner of the fourth aspect, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

With reference to any one of the foregoing possible implementation manners, in a seventh possible implementation manner of the fourth aspect, when a transmission mode in the second serving cell is a D2D communication mode, the D2D data is at least one of SA information and service data.

With reference to any one of the foregoing possible implementation manners, in an eighth possible implementation manner of the fourth aspect, before the generating scheduling information according to a second serving cell identifier and an available device to device D2D transmission resource in a second serving cell, the method further includes: receiving a carrier list sent by the user equipment, where the carrier list carries carrier information that a current terminal is interested in, and the carrier information is frequency information, or cell set information on a frequency; and acquiring the second serving cell according to the carrier list.

With reference to the eighth possible implementation manner of the fourth aspect, in a ninth possible implementation manner of the fourth aspect, the carrier list further carries a signal measurement report of the frequency or a signal measurement report of a cell set.

With reference to any one of the foregoing possible implementation manners, in a tenth possible implementation manner of the fourth aspect, the first serving cell is a primary serving cell, or a secondary serving cell other than the second serving cell.

According to a fifth aspect, an embodiment of the present invention further provides user equipment, where the user equipment includes: a transmitter, a receiver, a memory, and a processor that is separately connected to the transmitter, the receiver, and the memory, where a set of program code is stored in the memory, and the processor is configured to invoke the program code stored in the memory, to perform the following operations: receiving scheduling information sent by a first serving cell, where the scheduling information carries at least a second serving cell identifier and an available device to device D2D transmission resource in a second serving cell; performing cell synchronization with the second serving cell based on the second serving cell identifier; and sending device to device D2D data on the available D2D transmission resource in the second serving cell according to the scheduling information.

According to a sixth aspect, an embodiment of the present invention further provides a base station, where the base station includes: a transmitter, a receiver, a memory, and a processor that is separately connected to the transmitter, the receiver, and the memory, where a set of program code is stored in the memory, and the processor is configured to invoke the program code stored in the memory, to perform the following operations: generating scheduling information according to a second serving cell identifier and an available device to device D2D transmission resource in a second serving cell; and sending the scheduling information to user equipment within coverage of a first serving cell, so that the user equipment sends device to device D2D data on the available D2D transmission resource in the second serving cell according to the scheduling information.

The technical solutions provided in the embodiments of the present invention have the following beneficial effects:

User equipment within coverage of a first serving cell may learn an available D2D transmission resource in a second serving cell, and transmit D2D data on the available D2D transmission resource provided by the second serving cell, thereby effectively reducing load of the first serving cell.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
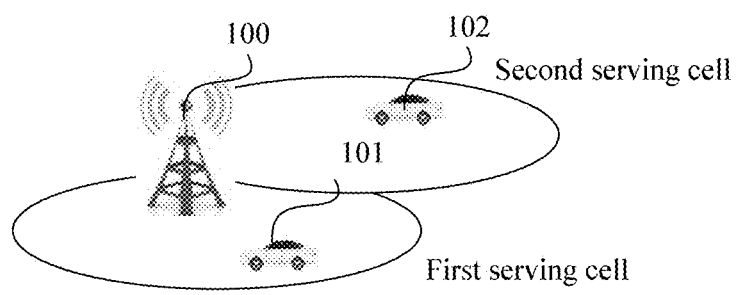
FIG. 1 is a schematic diagram of an implementation scenario according to an embodiment of the present invention.

FIG. 1 is a schematic diagram of an implementation scenario according to an embodiment of the present invention. Referring to FIG. 1, the implementation scenario includes UE (user equipment) 101, UE 102, and a base station 100. The base station 100 includes a first serving cell and a second serving cell. The UE provided in this embodiment of the present invention may refer to an in-vehicle communications system, vehicle-mounted user equipment, or user equipment, such as a smartphone or other handheld device, held by a user inside a vehicle. The first serving cell may be a cell that currently serves the UE 101, and the second serving cell may be a neighboring cell of the first serving cell, or any cell that belongs to the base station 100 other than the first serving cell, which is not limited in this embodiment of the present invention. Preferably, the first serving cell is a primary serving cell PCell or a secondary serving cell SCell other than the second serving cell.

D2D transmission specifically includes a D2D discovery mode and a D2D communication mode according to different transmission modes. In the D2D discovery mode, user equipment needs to perform transmission on a transmission resource in a serving cell on which the user equipment camps. When the user equipment needs to send data, the user equipment acquires a block of data transmission resource by means of scheduling by a base station or by means of contention, and then directly transmits D2D data to another user equipment by using the resource. In the D2D communication mode, data is sent by using an SA+DATA mode. When user equipment needs to send data DATA, the user equipment first sends a piece of SA information, where the SA information indicates a time-frequency position of a block of transmission resource and a corresponding modulation and coding scheme. After successfully receiving and decoding the SA information, user equipment serving as a receive end receives the corresponding service data DATA at the time-frequency resource position indicated by the SA information, and performs decoding according to the modulation and coding scheme specified by the SA information.

It should be noted that in the D2D discovery mode, an available D2D transmission resource includes at least one of a dynamic service data transmission resource, a semi-static service data transmission resource, and a service data transmission resource pool.

However, for the D2D communication mode, an available D2D transmission resource includes at least one of an available SA (scheduling assignment) resource and an available service data transmission resource. The available SA resource includes at least one of a dynamic SA data transmission resource, a semi-static SA data transmission resource, and an SA data transmission resource pool. The available service data transmission resource includes at least one of a dynamic service data transmission resource, a semi-static service data transmission resource, and a service data transmission resource pool. The SA information is used to indicate a time-frequency position of a particular data transmission resource and a modulation and coding scheme, and the available service data transmission resource is used to send service data.

Figure 2:
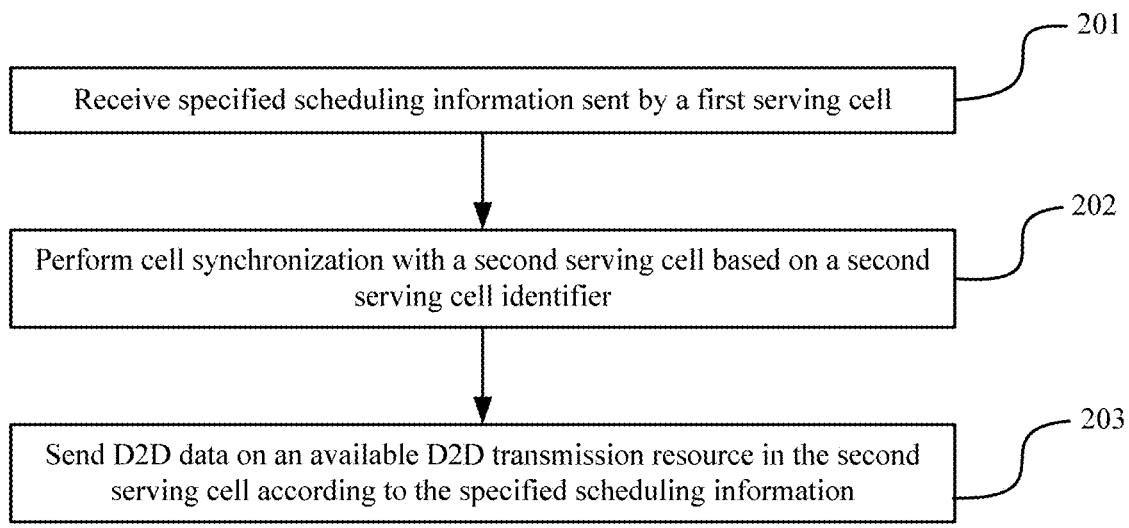
FIG. 2 is a schematic flowchart of a data sending method according to an embodiment of the present invention.

FIG. 2 is a schematic flowchart of a data sending method according to an embodiment of the present invention. Referring to FIG. 2, this embodiment is executed by user equipment, and this embodiment specifically includes as follows.

201: Receive specified scheduling information sent by a first serving cell, where the specified scheduling information carries at least a second serving cell identifier and an available device to device D2D transmission resource in a second serving cell.

When the user equipment camps on the first serving cell, the user equipment may receive the specified scheduling information sent by the first serving cell, in a manner such as by using RRC (radio resource control) control information, PDCCH (physical downlink control channel) scheduling information, or system broadcast information, so as to learn the available D2D transmission resource in the second serving cell.

It should be noted that the available D2D transmission resource in the second serving cell may be a transmission resource that can be allocated as determined by the second serving cell according to a current user access status or service status of the second serving cell.

The first serving cell may acquire information about the available D2D transmission resource in the second serving cell when determining that a transmission resource of the first serving cell is insufficient, so as to provide the information to the user equipment. Certainly, this process is not only for purpose of resolving a problem that the current resource is insufficient, but also may be for purpose of providing more options to the user equipment, so as to avoid a resource conflict.

It should be noted that in an actual scenario, that the specified scheduling information carries at least an available device to device D2D transmission resource in a second serving cell may refer to carrying information about the available D2D transmission resource in the second serving cell, where the information about the available D2D transmission resource may be a time-frequency position of the available D2D transmission resource.

Optionally, on the basis of the embodiment shown in FIG. 2, step 201 of "receiving specified scheduling information sent by a first serving cell" includes any one of the following cases 201A to 201C.

201A: Receive RRC control information sent by the first serving cell, where the RRC control information carries the specified scheduling information.

The specified scheduling information may be carried in the RRC control information, and received in a process in which the user equipment establishes an RRC connection to the first serving cell. When the RRC control information is received, the specified scheduling information may be carried in a specified bit in the RRC control information. When the user equipment receives the RRC control information, the user equipment may parse the specified bit in the RRC control information, to obtain the specified scheduling information.

201B: Receive PDCCH scheduling information sent by the first serving cell, where the PDCCH scheduling information carries the specified scheduling information.

The specified scheduling information may be carried in a specified bit in the PDCCH scheduling information. When the user equipment receives the PDCCH scheduling information, the user equipment may parse the specified bit in the PDCCH scheduling information, to obtain the specified scheduling information.

201C: Receive system broadcast information sent by the first serving cell, where the system broadcast information carries the specified scheduling information.

The specified scheduling information may be carried in a specified bit in the system broadcast information. When the user equipment receives the system broadcast information, the user equipment may parse the specified bit in the system broadcast information, to obtain the specified scheduling information.

Further, the specified scheduling information may further carry a D2D transmission mode in the second serving cell. After receiving the specified scheduling information, the user equipment may determine a transmission mode in the second serving cell according to the transmission mode carried in the specified scheduling information, and the determining may be performed by parsing a specified bit in the specified scheduling information. For example, if the transmission mode obtained by parsing the specified scheduling information is a D2D discovery mode, it is determined that the transmission mode in the second serving cell is the D2D discovery mode, and the D2D discovery mode is used in subsequent data transmission.

For the D2D discovery mode, content carried in the specified scheduling information may include the second serving cell identifier, and the available D2D transmission resource in the second serving cell. The available D2D transmission resource may be used to transmit D2D data.

Further, the specified scheduling information may further carry a modulation and coding scheme. After receiving the specified scheduling information, the user equipment further needs to determine, according to the specified scheduling information, a modulation and coding scheme that is used in data transmission. In the D2D discovery mode, the specified scheduling information may further include the modulation and coding scheme that is used in data transmission, and the user equipment may perform modulation and coding by using the modulation and coding scheme, to obtain D2D data, and then send the D2D data on a data transmission resource (pool) indicated by the specified scheduling information.

202: Perform cell synchronization with the second serving cell based on the second serving cell identifier.

The synchronization may refer to a process such as time synchronization or frequency synchronization between the user equipment and the second serving cell, which is not specifically limited in this embodiment of the present invention. In addition, the synchronization may refer to uplink synchronization or downlink synchronization, which is not limited in this embodiment of the present invention.

203: Send D2D data on the available D2D transmission resource in the second serving cell according to the specified scheduling information.

In the D2D discovery mode, the D2D data is used to refer to data that may be involved in D2D transmission, such as service data. For example, the service data may include vehicle safety information.

In another embodiment, for example, in a D2D communication mode, the D2D data may be used to refer to at least one of SA information and service data that may be involved in D2D transmission.

Further, the available D2D transmission resource in the second serving cell is a dynamic transmission resource, a semi-static transmission resource, or a transmission resource pool. Accordingly, when the available D2D transmission resource in the second serving cell is a dynamic transmission resource, the user equipment remains in a state of connection with the first serving cell. The dynamic transmission resource in the second serving cell may be scheduled by the first serving cell based on resource scheduling. Therefore, to ensure that the user equipment can normally receive and send control signaling, the user equipment still remains in the state of connection with the first serving cell when performing data transmission. When a semi-static transmission resource or a transmission resource pool is allocated, the user equipment may either be in the state of connection or be in a state of being idle with the first serving cell, and the user equipment may either be in the state of connection or be in the state of being idle with the second serving cell. Specifically, there are several cases as follows. When the available D2D transmission resource in the second serving cell is a semi-static transmission resource or a transmission resource pool, the user equipment remains in the state of connection with the first serving cell. When the available D2D transmission resource in the second serving cell is a semi-static transmission resource or a transmission resource pool, the user equipment remains in the state of being idle with the first serving cell. When the available D2D transmission resource in the second serving cell is a semi-static transmission resource or a transmission resource pool, the user equipment remains in the state of connection with the second serving cell. When the available D2D transmission resource in the second serving cell is a semi-static transmission resource or a transmission resource pool, the user equipment remains in the state of being idle with the second serving cell.

By means of the method provided in this embodiment of the present invention, user equipment within coverage of a first serving cell may learn an available D2D transmission resource in a second serving cell, and transmit D2D data on the available D2D transmission resource provided by the second serving cell, thereby effectively reducing load of the first serving cell.

Optionally, based on the embodiment provided in FIG. 2, before step 201 of "receiving specified scheduling information sent by a first serving cell", the method further includes the following steps.

Step 200: Send a carrier list to the first serving cell, where the carrier list carries carrier information that a current terminal is interested in, and the carrier information that the terminal is interested in is information about frequencies on which or a set of cells in which the terminal intends to perform D2D communication, so that the first serving cell acquires the second serving cell according to the carrier list.

The user equipment may send a carrier list to the first serving cell in advance, so that the first serving cell acquires the second serving cell according to the carrier list. The carrier list carries carrier information that a current terminal is interested in, and the carrier information is frequency information or cell set information. For the user equipment, frequency information required for D2D communication transmission may be pre-configured on the user equipment. Therefore, when the user equipment sends the frequency information to the first serving cell, the first serving cell may select, according to frequency information of at least one other cell that belongs to a same base station as the first serving cell, a cell that matches the frequency information from the at least one other cell, as the second serving cell. The matching may refer to that a center frequency of the cell is the same as the frequency information, or falls within a range specified by the frequency information, and so on, which is not limited in this embodiment of the present invention. The user equipment may also receive system broadcast sent by the base station when the user equipment enters a coverage area of the base station. The system broadcast may carry cells in the base station and frequency information of the cells, and the user equipment selects at least one cell from the cells in the base station to obtain cell set information, and sends the cell set information to the first serving cell, so that the first serving cell selects the second serving cell for the user equipment according to the cell set information. It should be noted that when selecting the second serving cell, the first serving cell not only may perform the selection based on the frequency information sent by the user equipment, but also may further comprehensively consider user access statuses of other cells in the base station and so on, so as to avoid affecting normal services of the other cells. Certainly, the first serving cell may select multiple second serving cells for the user equipment, and the specified scheduling information carries available service data transmission resources of the multiple second serving cells; the user equipment selects, according to a factor such as its service requirement, an available D2D transmission resource of any second serving cell from the available service data transmission resources, and uses the available D2D transmission resource as a carrier for subsequently sending data.

Further, the carrier list further carries a signal measurement report of the frequency or a signal measurement report of a cell set. The carrier list may further carry the signal measurement report of the frequency, and the user equipment may perform measurement, for example, energy measurement, on a carrier that the user equipment is interested in, to learn whether a carrier is currently idle, and actively notifies the first serving cell of a specific status of the carrier that the user equipment is interested in, so that the first serving cell configures the second serving cell according to the signal measurement report. Certainly, the carrier list sent by the user equipment may further include the signal measurement report of the cell set, to actively notify the first serving cell of a current communication status of each cell, so that the first serving cell configures the second serving cell according to the signal measurement report.

In the D2D communication mode, because data is sent by using an SA+DATA mode, an available D2D transmission resource in each serving cell includes an SA resource (pool) and a data transmission resource (pool). Therefore, when resource scheduling is performed, at least one of an available SA resource and an available service data transmission resource that is in the second serving cell may be provided to user equipment in the first serving cell. That is, the available D2D transmission resource in the second serving cell may include at least one of the available SA resource and the available service data transmission resource, so that the user equipment may send at least one of SA information and service data on a resource in the second serving cell. Based on the foregoing descriptions, there may be different implementation manners, which are described below respectively.

Figure 3:
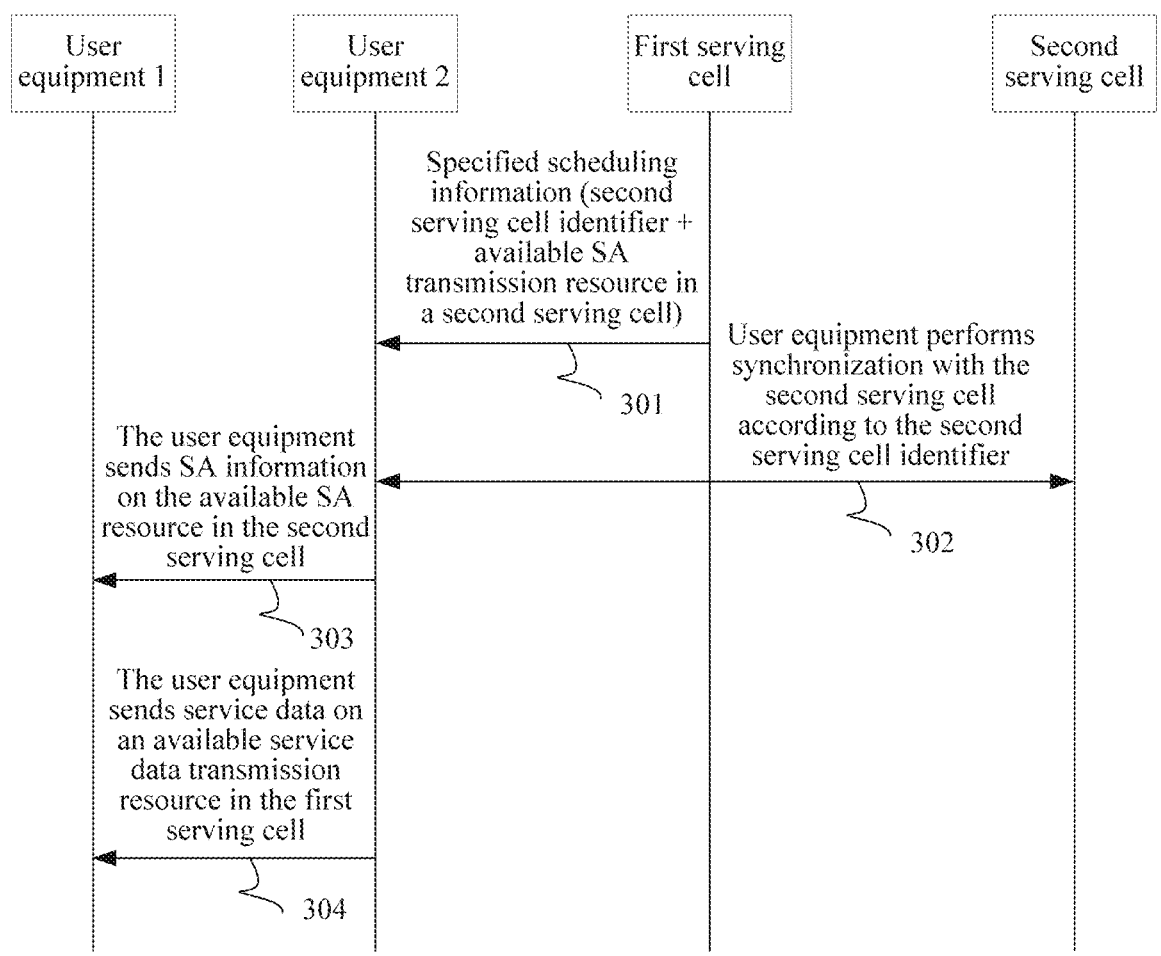
FIG. 3 is a schematic flowchart of a data sending method according to an embodiment of the present invention.

FIG. 3 is a schematic flowchart of a data sending method according to an embodiment of the present invention. Referring to FIG. 3, user equipment described in this embodiment of the present invention is user equipment 2 in FIG. 3, and user equipment 1 is a communication peer end of the user equipment 2. In the embodiment provided in FIG. 3, the user equipment sends SA information on an available SA resource in a second serving cell, and sends service data on an available service data transmission resource in a first serving cell. Specifically, this embodiment includes the following steps.

301: User equipment receives specified scheduling information sent by a first serving cell, where the specified scheduling information carries at least a second serving cell identifier and an available SA transmission resource in a second serving cell, and the specified scheduling information further carries an available service data transmission resource in the first serving cell.

302: The user equipment performs synchronization with the second serving cell according to the second serving cell identifier.

303: The user equipment sends SA information on the available SA resource in the second serving cell, where the SA information is used to indicate the available service data transmission resource in the first serving cell and a modulation and coding scheme.

304: The user equipment sends service data on the available service data transmission resource in the first serving cell.

By means of the method provided in this embodiment of the present invention, user equipment within coverage of a first serving cell may learn an available SA resource in a second serving cell, and send SA information on the available SA resource provided by the second serving cell, where the SA information indicates an available service data transmission resource in the first serving cell and a modulation and coding scheme, so that the user equipment may send service data on the available service data transmission resource in the first serving cell, thereby effectively reducing load of the first serving cell.

Figure 4:
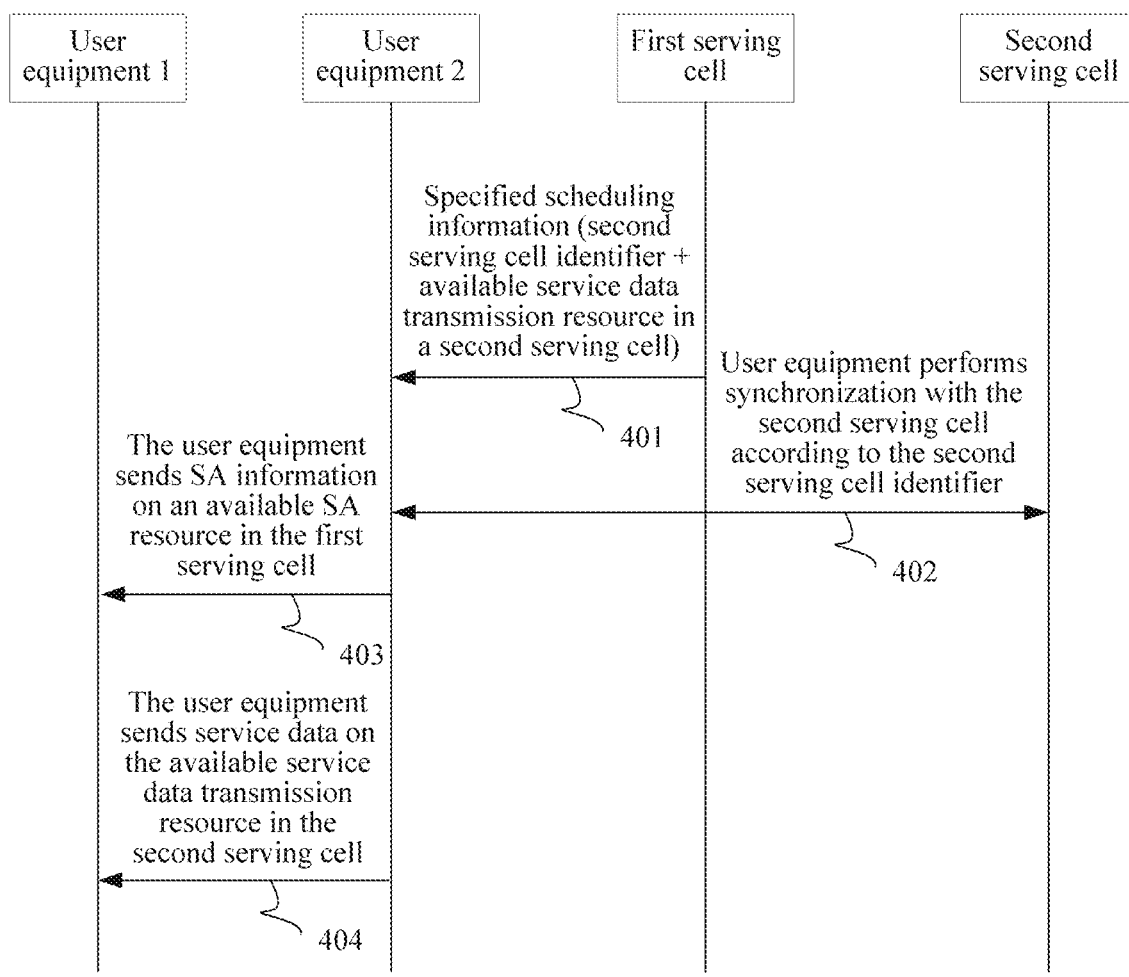
FIG. 4 is a schematic flowchart of a data sending method according to an embodiment of the present invention.

FIG. 4 is a schematic flowchart of a data sending method according to an embodiment of the present invention. Referring to FIG. 4, user equipment described in this embodiment of the present invention is user equipment 2 in FIG. 4, and user equipment 1 is a communication peer end of the user equipment 2. In the embodiment provided in FIG. 4, the user equipment sends SA information on an available SA resource in a first serving cell, and sends service data on an available service data transmission resource in a second serving cell. Specifically, this embodiment includes the following steps.

401: User equipment receives specified scheduling information sent by a first serving cell, where the specified scheduling information carries at least a second serving cell identifier and an available service data transmission resource in a second serving cell, and the specified scheduling information further carries an available SA resource in the first serving cell.

402: The user equipment performs synchronization with the second serving cell according to the second serving cell identifier.

403: The user equipment sends SA information on the available SA resource in the first serving cell, where the SA information is used to indicate the available service data transmission resource in the second serving cell and a modulation and coding scheme.

404: The user equipment sends service data on the available service data transmission resource in the second serving cell.

By means of the method provided in this embodiment of the present invention, user equipment within coverage of a first serving cell may learn an available service data transmission resource in a second serving cell, and send SA information on an available SA resource in the first serving cell, where the SA information indicates the available service data transmission resource in the second serving cell and a modulation and coding scheme, so that the user equipment may send service data on the available service data transmission resource in the second serving cell, thereby effectively reducing load of the first serving cell.

Figure 5:
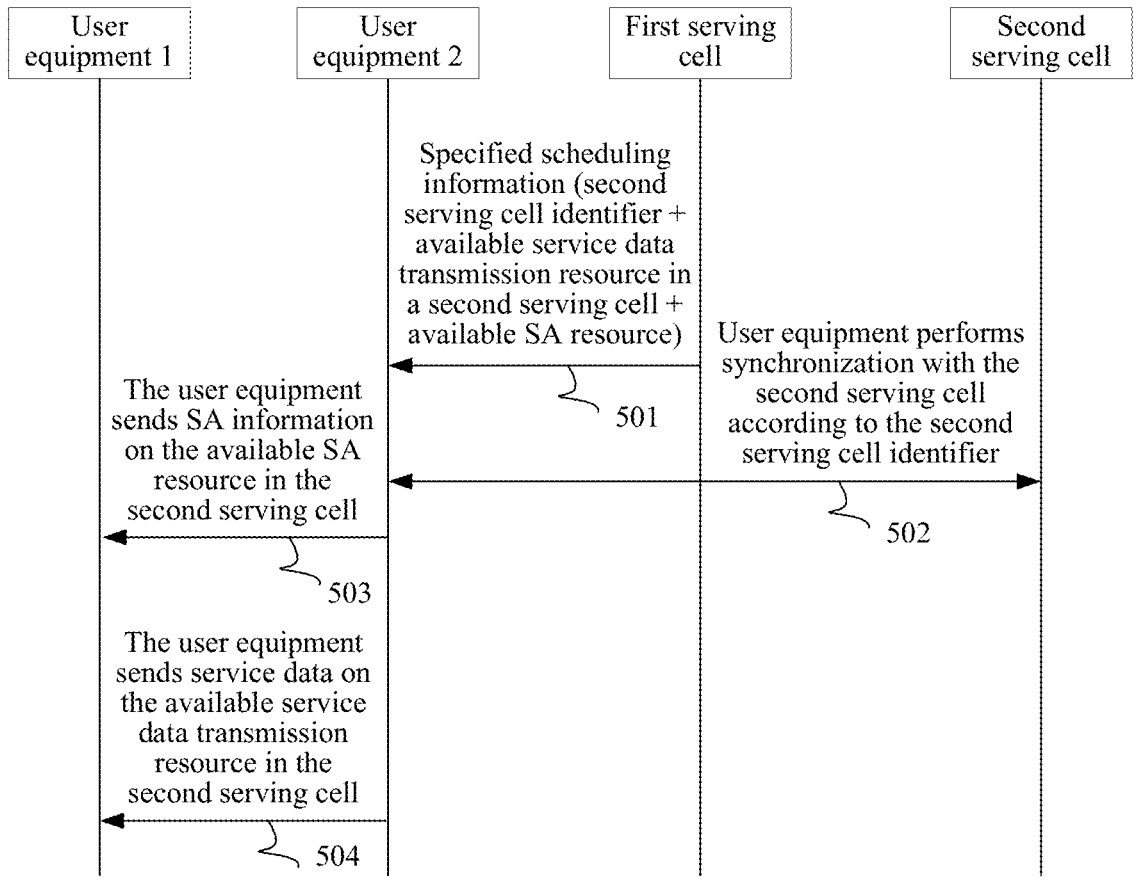
FIG. 5 is a schematic flowchart of a data sending method according to an embodiment of the present invention.

FIG. 5 is a schematic flowchart of a data sending method according to an embodiment of the present invention. Referring to FIG. 5, user equipment described in this embodiment of the present invention is user equipment 2 in FIG. 5, and user equipment 1 is a communication peer end of the user equipment 2. In the embodiment provided in FIG. 5, the user equipment sends SA information on an available SA resource in a second serving cell, and sends service data on an available service data transmission resource in the second serving cell. Specifically, this embodiment includes the following steps.

501: User equipment receives specified scheduling information sent by a first serving cell, where the specified scheduling information carries at least a second serving cell identifier, and an available service data transmission resource and an available SA resource that are in a second serving cell.

502: The user equipment performs synchronization with the second serving cell according to the second serving cell identifier.

503: The user equipment sends SA information on the available SA resource in the second serving cell, where the SA information is used to indicate the available service data transmission resource in the second serving cell and a modulation and coding scheme.

504: The user equipment sends service data on the available service data transmission resource in the second serving cell.

By means of the method provided in this embodiment of the present invention, user equipment within coverage of a first serving cell may learn an available SA resource and an available service data transmission resource that are in a second serving cell, and send SA information on the available SA resource in the second serving cell, where the SA information indicates the available service data transmission resource in the second serving cell and a modulation and coding scheme, so that the user equipment may send service data on the available service data transmission resource in the second serving cell, thereby effectively reducing load of the first serving cell.

Figure 6:
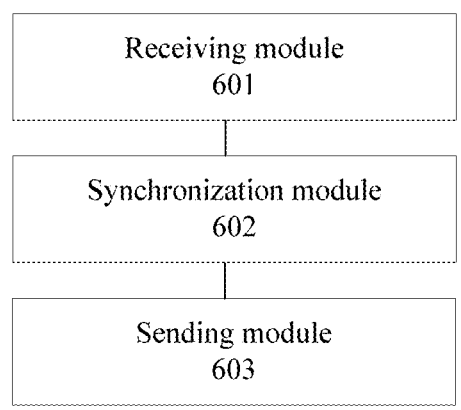
FIG. 6 is a schematic structural diagram of a data sending apparatus according to an embodiment of the present invention.

FIG. 6 is a schematic structural diagram of a data sending apparatus according to an embodiment of the present invention. Referring to FIG. 6, the apparatus includes: a receiving module 601, configured to receive specified scheduling information sent by a first serving cell, where the specified scheduling information carries at least a second serving cell identifier and an available device to device D2D transmission resource in a second serving cell; a synchronization module 602, configured to perform cell synchronization with the second serving cell based on the second serving cell identifier; and a sending module 603, configured to send device to device D2D data on the available D2D transmission resource in the second serving cell according to the specified scheduling information.

Optionally, the receiving module 601 is configured to receive RRC control information sent by the first serving cell, where the RRC control information carries the specified scheduling information; or the receiving module 601 is configured to receive PDCCH scheduling information sent by the first serving cell, where the PDCCH scheduling information carries the specified scheduling information; or the receiving module 601 is configured to receive system broadcast information sent by the first serving cell, where the system broadcast information carries the specified scheduling information.

Optionally, the specified scheduling information further carries a transmission mode in the second serving cell, and the transmission mode is a D2D discovery mode or a D2D communication mode.

Optionally, the sending module 603 is configured to send the device to device D2D data on the available D2D transmission resource in the second serving cell by using the transmission mode in the second serving cell that is carried in the specified scheduling information.

Optionally, the available D2D transmission resource in the second serving cell includes at least one of a dynamic service data transmission resource, a semi-static service data transmission resource, and a service data transmission resource pool.

Optionally, the specified scheduling information further includes a modulation and coding scheme that is used in data transmission.

Optionally, the apparatus further includes: a modulation and coding module, configured to perform modulation and coding on to-be-transmitted service data by using the modulation and coding scheme, to obtain the D2D data.

Optionally, when a transmission mode in the second serving cell is a D2D communication mode, the available D2D transmission resource in the second serving cell includes at least one of an available SA resource and an available service data transmission resource.

Optionally, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

Optionally, when a transmission mode in the second serving cell is a D2D communication mode, the D2D data is at least one of SA information and service data.

Optionally, the sending module 603 is configured to: when the specified scheduling information carries the second serving cell identifier, an available service data transmission resource in the first serving cell, and an available SA resource in the second serving cell, send the SA information on the available SA resource in the second serving cell, and send the service data on the available service data transmission resource in the first serving cell, where the SA information is used to indicate the available service data transmission resource in the first serving cell and a modulation and coding scheme.

Optionally, the sending module 603 is configured to: when the specified scheduling information carries the second serving cell identifier, an available SA resource in the first serving cell, and an available service data transmission resource in the second serving cell, send the SA information on the available SA resource in the first serving cell, and send the service data on the available service data transmission resource in the second serving cell, where the SA information is used to indicate the available service data transmission resource in the second serving cell and a modulation and coding scheme.

Optionally, the sending module 603 is configured to: when the specified scheduling information carries the second serving cell identifier, an available SA resource in the second serving cell, and an available service data transmission resource in the second serving cell, send the SA information on the available SA resource in the second serving cell, and send the service data on the available service data transmission resource in the second serving cell, where the SA information is used to indicate the available service data transmission resource in the second serving cell and a modulation and coding scheme.

Optionally, the sending module 603 is further configured to send a carrier list to the first serving cell, where the carrier list carries carrier information that a current terminal is interested in, and the carrier information is frequency information, or cell set information on a frequency, so that the first serving cell acquires the second serving cell according to the carrier list.

Optionally, the carrier list further carries a signal measurement report of the frequency or a signal measurement report of a cell set.

Optionally, the apparatus further includes: a connection processing module, where the connection processing module is configured to: when the available D2D transmission resource in the second serving cell is a dynamic transmission resource, remain in a state of connection with the first serving cell; or the connection processing module is configured to: when the available D2D transmission resource in the second serving cell is a semi-static transmission resource or a transmission resource pool, remain in a state of connection with the first serving cell; or the connection processing module is configured to: when the available D2D transmission resource in the second serving cell is a semi-static transmission resource or a transmission resource pool, remain in a state of being idle with the first serving cell; or the connection processing module is configured to: when the available D2D transmission resource in the second serving cell is a semi-static transmission resource or a transmission resource pool, remain in a state of connection with the second serving cell; or the connection processing module is configured to: when the available D2D transmission resource in the second serving cell is a semi-static transmission resource or a transmission resource pool, remain in a state of being idle with the second serving cell.

Optionally, the first serving cell is a primary serving cell or a secondary serving cell other than the second serving cell.

Figure 7:
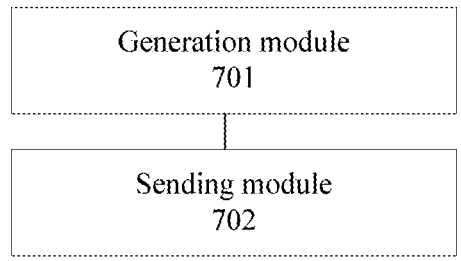
FIG. 7 is a schematic structural diagram of a base station according to an embodiment of the present invention.

FIG. 7 is a schematic structural diagram of a base station according to an embodiment of the present invention. Referring to FIG. 7, the base station includes: a generation module 701, configured to generate specified scheduling information according to a second serving cell identifier and an available device to device D2D transmission resource in a second serving cell; and a sending module 702, configured to send the specified scheduling information to user equipment within coverage of a first serving cell, so that the user equipment sends device to device D2D data on the available D2D transmission resource in the second serving cell according to the specified scheduling information.

Optionally, the sending module 702 is configured to send RRC control information to the user equipment, where the RRC control information carries the specified scheduling information; or the sending module 702 is configured to send PDCCH scheduling information to the user equipment, where the PDCCH scheduling information carries the specified scheduling information; or the sending module 702 is configured to send system broadcast information to the user equipment, where the system broadcast information carries the specified scheduling information.

Optionally, the specified scheduling information further carries a transmission mode in the second serving cell, and the transmission mode is a D2D discovery mode or a D2D communication mode.

Optionally, the available D2D transmission resource in the second serving cell includes at least one of a dynamic service data transmission resource, a semi-static service data transmission resource, and a service data transmission resource pool.

Optionally, the specified scheduling information further includes a modulation and coding scheme that is used in data transmission.

Optionally, when a transmission mode in the second serving cell is a D2D communication mode, the available D2D transmission resource in the second serving cell includes at least one of an available SA resource and an available service data transmission resource.

Optionally, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

Optionally, when a transmission mode in the second serving cell is a D2D communication mode, the D2D data is at least one of SA information and service data.

Optionally, the base station further includes: a receiving module, configured to receive a carrier list sent by the user equipment, where the carrier list carries carrier information that a current terminal is interested in, and the carrier information is frequency information, or cell set information on a frequency; and an acquiring module, configured to acquire the second serving cell according to the carrier list.

Optionally, the carrier list further carries a signal measurement report of the frequency or a signal measurement report of a cell set.

Optionally, the first serving cell is a primary serving cell or a secondary serving cell other than the second serving cell.

Figure 8:
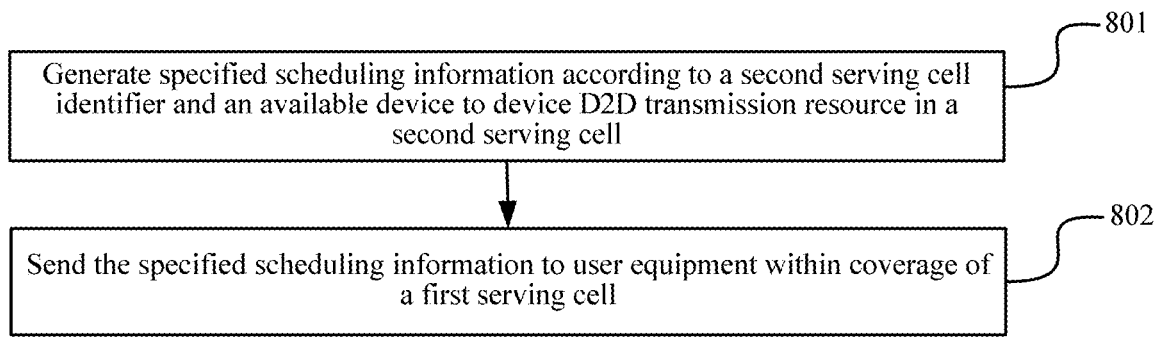
FIG. 8 is a flowchart of a resource scheduling method according to an embodiment of the present invention.

FIG. 8 is a flowchart of a resource scheduling method according to an embodiment of the present invention. The resource scheduling method may be applied to a base station. Referring to FIG. 8, the method includes the following steps.

801: Generate specified scheduling information according to a second serving cell identifier and an available device to device D2D transmission resource in a second serving cell.

802: Send the specified scheduling information to user equipment within coverage of a first serving cell, so that the user equipment sends device to device D2D data on the available D2D transmission resource in the second serving cell according to the specified scheduling information.

Optionally, the sending the specified scheduling information to user equipment includes: sending RRC control information to the user equipment, where the RRC control information carries the specified scheduling information; or sending PDCCH scheduling information to the user equipment, where the PDCCH scheduling information carries the specified scheduling information; or sending system broadcast information to the user equipment, where the system broadcast information carries the specified scheduling information.

Optionally, the specified scheduling information further carries a transmission mode in the second serving cell, and the transmission mode is a D2D discovery mode or a D2D communication mode.

Optionally, the available D2D transmission resource in the second serving cell includes at least one of a dynamic service data transmission resource, a semi-static service data transmission resource, and a service data transmission resource pool.

Optionally, the specified scheduling information further includes a modulation and coding scheme that is used in data transmission.

Optionally, when a transmission mode in the second serving cell is a D2D communication mode, the available D2D transmission resource in the second serving cell includes at least one of an available SA resource and an available service data transmission resource.

Optionally, the available SA resource includes at least one of a dynamic SA data transmission resource, a semi-static SA data transmission resource, and an SA data transmission resource pool, and the available service data transmission resource includes at least one of a dynamic service data transmission resource, a semi-static service data transmission resource, and a service data transmission resource pool.

Optionally, when a transmission mode in the second serving cell is a D2D communication mode, the D2D data is at least one of SA information and service data.

Optionally, before the generating specified scheduling information according to a second serving cell identifier and an available device to device D2D transmission resource in a second serving cell, the method further includes: receiving a carrier list sent by the user equipment, where the carrier list carries carrier information that a current terminal is interested in, and the carrier information is frequency information, or cell set information on a frequency; and acquiring the second serving cell according to the carrier list.

Optionally, the carrier list further carries a signal measurement report of the frequency or a signal measurement report of a cell set.

Optionally, the first serving cell is a primary serving cell or a secondary serving cell other than the second serving cell.

Figure 9:
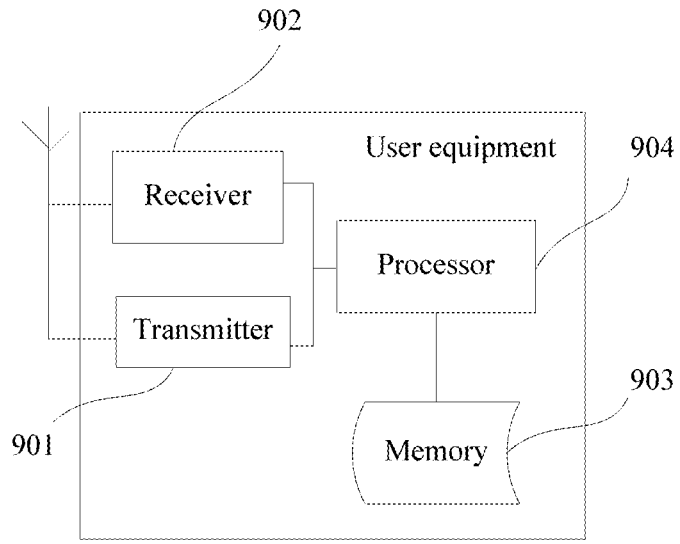
FIG. 9 is a schematic structural diagram of user equipment according to an embodiment of the present invention.

FIG. 9 is a schematic structural diagram of user equipment according to an embodiment of the present invention.

As shown in FIG. 9, the user equipment includes a transmitter 901, a receiver 902, a memory 903, and a processor 904 that is separately connected to the transmitter 901, the receiver 902, and the memory 903. Certainly, the user equipment may further include general components such as an antenna, a baseband processing component, an intermediate radio frequency processing component, and an input and output apparatus, which is not limited in this embodiment of the present invention in any way.

A set of program code is stored in the memory, and the processor 904 is configured to invoke the program code stored in the memory, to perform the following operations: receiving specified scheduling information sent by a first serving cell, where the specified scheduling information carries at least a second serving cell identifier and an available device to device D2D transmission resource in a second serving cell; performing cell synchronization with the second serving cell based on the second serving cell identifier; and sending device to device D2D data on the available D2D transmission resource in the second serving cell according to the specified scheduling information.

Further, the program code is further used to perform the operations in the foregoing data sending method.

Figure 10:
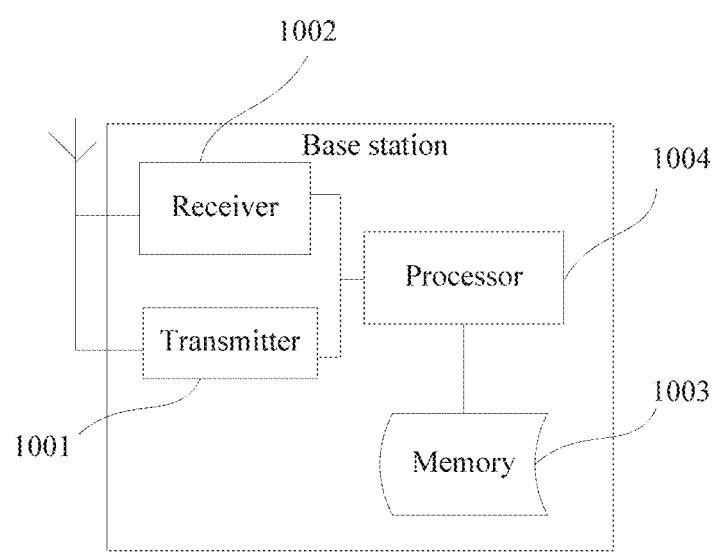
FIG. 10 is a schematic structural diagram of a base station according to an embodiment of the present invention.

FIG. 10 is a schematic structural diagram of a base station according to an embodiment of the present invention. As shown in FIG. 10, the base station includes a transmitter 1001, a receiver 1002, a memory 1003, and a processor 1004 that is separately connected to the transmitter 1001, the receiver 1002, and the memory 1003. Certainly, the base station may further include general components such as an antenna, a baseband processing component, an intermediate radio frequency processing component, and an input and output apparatus, which is not limited in this embodiment of the present invention in any way.

A set of program code is stored in the memory, and the processor 1004 is configured to invoke the program code stored in the memory, to perform the following operations: generating specified scheduling information according to a second serving cell identifier and an available device to device D2D transmission resource in a second serving cell; and sending the specified scheduling information to user equipment within coverage of a first serving cell, so that the user equipment sends device to device D2D data on the available D2D transmission resource in the second serving cell according to the specified scheduling information.

Further, the program code is further used to perform the operations in the foregoing resource scheduling method.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. An apparatus comprising:
a memory storing program instructions; and
at least one processor coupled to the memory, wherein the program instructions, when executed by the at least one processor, cause the apparatus to:
send, to a base station, a carrier list, wherein the base station provides a first serving cell serving the apparatus, the carrier list carries carrier information that the apparatus is interested in, the carrier information comprises frequency information, and the carrier information sent to the base station is used fir determination of a second serving cell;
after sending the carrier list, receive scheduling information from the base station, wherein the scheduling information carries a serving cell identifier of the second serving cell and an available device to device transmission resource in the second serving cell;
perform cell synchronization with the second serving cell based on the serving cell identifier of the second serving cell; and
send device to device data on the available device to device transmission resource in the second serving cell according to the scheduling information.

2. The apparatus according to claim 1, wherein the program instructions, when executed by the at least one processor, cause the apparatus to:
receive radio resource control (RRC) control information from the base station, wherein the RRC control information carries the scheduling information; or
receive system broadcast information from the base station, wherein the system broadcast information carries the scheduling information.

3. The apparatus according to claim 1, wherein the scheduling information further carries a transmission mode in the second serving cell, and the transmission mode is one of a device to device discovery mode and a device to device communication mode.

4. The apparatus according to claim 1, wherein the available device to device transmission resource in the second serving cell comprises at least one of a dynamic service data transmission resource, a semi-static service data transmission resource, or a service data transmission resource pool.

5. The apparatus according to claim 1, wherein a transmission mode in the second serving cell is a device to device communication mode, the available device to device transmission resource in the second serving cell comprises an available scheduling assignment (SA) resource or an available service data transmission resource.

6. The apparatus according to claim 5, wherein the available SA resource comprises at least one of a dynamic SA data transmission resource, a semi-static SA data transmission resource, or an SA data transmission resource pool, and the available service data transmission resource comprises at least one of a dynamic service data transmission resource, a semi-static service data transmission resource, or a service data transmission resource pool.

7. A method, comprising:
sending, by an apparatus to a base station, a carrier list, wherein the base station provides a first serving cell serving the apparatus, the carrier list carries carrier information that the apparatus is interested in, the carrier information comprises frequency information, and the carrier information sent to the base station is used for determination of a second serving cell;
after the sending the carrier list, receiving, by the apparatus, scheduling information from the base station, wherein the scheduling information carries a serving cell identifier of the second serving cell and an available device to device transmission resource in the second serving cell;
performing, by the apparatus, cell synchronization with the second serving cell based on the serving cell identifier of the second serving cell; and sending, by the apparatus, device to device data on the available device to device transmission resource in the second serving cell according to the scheduling information.

8. The method according to claim 7, wherein receiving the scheduling information from the base station of the first serving cell comprises:
receiving radio resource control (RRC) control information from the base station, wherein the RRC control information carries the scheduling information; or
receiving system broadcast information from the base station, wherein the system broadcast information carries the scheduling information.

9. The method according to claim 7, wherein the scheduling information further carries a transmission mode in the second serving cell, and the transmission mode is one of a device to device discovery mode and a device to device communication mode.

10. The method according to claim 7, Wherein the available device to device transmission resource in the second serving cell comprises at least one of a dynamic service data transmission resource, a semi-static service data transmission resource, or a service data transmission resource pool.

11. The method according to claim 7, Wherein a transmission mode in the second serving cell is a device to device communication mode, the available device to device transmission resource in the second serving cell comprises at least one of an available scheduling assignment (SA) resource or an available service data transmission resource.

12. The method according to claim 11, wherein the available SA resource comprises at least one of a dynamic SA data transmission resource, a semi-static SA data transmission resource, or an SA data transmission resource pool, and the available service data transmission resource comprises at least one of a dynamic service data transmission resource, a semi-static service data transmission resource, or a service data transmission resource pool.

13. An apparatus comprising:
a memory storing program instructions; and
at least one processor coupled to the memory, wherein the program instructions, when executed by the at least one processor, cause the apparatus to:
receive a carrier list from user equipment, wherein the carrier list carries carrier information that the user equipment is interested in, and the carrier information is frequency information;
determine a second serving cell according to the carrier list;
generate scheduling information according to a serving cell identifier of the second serving cell and an available device to device transmission resource in the second serving cell, the available device to device transmission resource in the second serving cell is used to transmit device to device data; and
send the scheduling information to the user equipment within coverage of a first serving cell.

14. The apparatus according to claim 13, wherein the program instructions, when executed by the at least one processor, cause the apparatus to:
send radio resource control (RRC) control information to the user equipment, wherein the RRC control information carries the scheduling information; or
send system broadcast information to the user equipment, wherein the system broadcast information carries the scheduling information.

15. The apparatus according to claim 13, wherein the scheduling information further carries a transmission mode in the second serving cell, and the transmission mode is one of a device to device discovery mode and a device to device communication mode.

16. The apparatus according to claim 13, wherein the available device to device transmission resource in the second serving cell comprises at least one of a dynamic service data transmission resource, a semi-static service data transmission resource, or a service data transmission resource pool.

17. The apparatus according to claim 13, wherein a transmission mode in the second serving cell is a device to device communication mode, the available device to device transmission resource in the second serving cell comprises an available scheduling assignment (SA) resource or an available service data transmission resource.

18. A method comprising:
receiving a carrier list from user equipment, wherein the carrier list carries carrier information that the user equipment is interested in, and the carrier information is frequency information;
determining a second serving cell according to the carrier list;
generating scheduling information according to a serving cell identifier of the second serving cell and an available device to device transmission resource in the second serving cell, the available device to device transmission resource in the second serving cell is used to transmit device to device data; and
sending the scheduling information to the user equipment within coverage of a first serving cell.

19. The method according to claim 18, wherein sending the scheduling information to the user equipment comprises:
sending radio resource control (RRC) control information to the user equipment, wherein the RRC control information carries the scheduling information; or
sending system broadcast information to the user equipment, wherein the system broadcast information carries the scheduling information.

20. The method according to claim 18, wherein the scheduling information further carries a transmission mode in the second serving cell, and the transmission mode is one of a device to device discovery mode and a device to device communication mode.

21. The method according to claim 18, wherein the available device to device transmission resource in the second serving cell comprises at least one of a dynamic service data transmission resource, a semi-static service data transmission resource, or a service data transmission resource pool.

* * * * *

UNITED STATES PATENT AND TRADEMARK OFFICE
CERTIFICATE OF CORRECTION

PATENT NO. : 11,134,525 B2
APPLICATION NO. : 15/727882
DATED : September 28, 2021
INVENTOR(S) : Yu et al.

Page 1 of 1

It is certified that error appears in the above-identified patent and that said Letters Patent is hereby corrected as shown below:

In the Claims

Claim 1, Column 22, Line 4; delete "fir" and insert --for--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*